No. 724,085. PATENTED MAR. 31, 1903.
G. N. COLLINS.
PHOTOGRAPHIC CAMERA.
APPLICATION FILED SEPT. 18, 1902.
NO MODEL.

Witnesses

Inventor
Guy N. Collins

UNITED STATES PATENT OFFICE.

GUY N. COLLINS, OF WASHINGTON, DISTRICT OF COLUMBIA.

PHOTOGRAPHIC CAMERA.

SPECIFICATION forming part of Letters Patent No. 724,085, dated March 31, 1903.

Application filed September 18, 1902. Serial No. 123,897. (No model.)

*To all whom it may concern:*

Be it known that I, GUY N. COLLINS, a citizen of the United States, residing at Washington, in the District of Columbia, have invented certain new and useful Improvements in Photographic Cameras, of which the following is a specification.

This invention relates to photographic cameras, and my object is to adapt an ordinary portable view-camera for use in photographing in their natural size natural-history specimens, such as plants, fruits, vegetables, &c. In the photographing of such specimens for record and for the illustration of scientific publications it is found to be extremely difficult to so mount the specimens on vertical surfaces that the photographing thereof in natural positions can be readily accomplished. It is also very desirable that naturalists in the field have readily-transportable means for making such full-sized photographs of specimens which cannot be long preserved in their natural conditions. So far as I am aware such photographs have never heretofore been made except in the laboratory or studio and by means of photographic apparatus and object-supports mounted upon unwieldy camera-stands incapable of use by scientific parties in the field.

To overcome these difficulties and at the same time not so modify the camera as to render it unfit for ordinary view-work, my invention, broadly considered, consists in mounting the frame and lens-axis of a portable view-camera in a vertical position and attaching to one of the hinged drops a support for the object photographed, which support may be readily adjusted at such distance from the lens as to give a full-sized image on the sensitive plate.

It also consists in affording a flexible swinging support for the camera in lieu of a tripod, by means of which both camera and object may be rotated about a vertical axis, so as to secure more uniform lighting.

Figure 1:
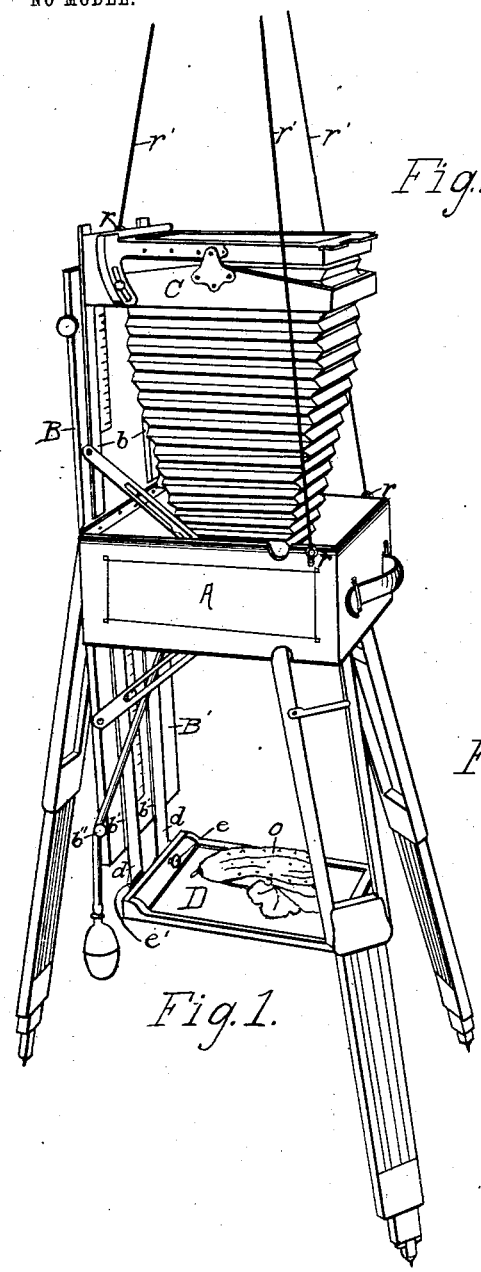
Figure 2:
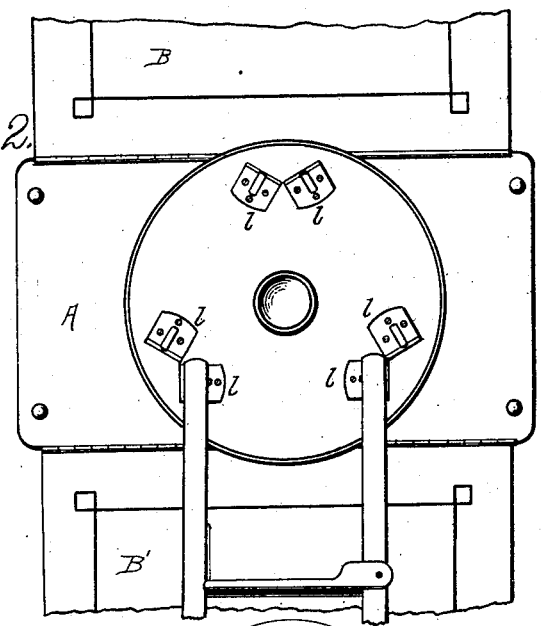

In the accompanying drawings, Figure 1 is a perspective view of the entire camera; Fig. 2, a side view of a portion of the camera frame or box, the tripod-head attached thereto, and a portion of one of the tripod-legs; and Fig. 3 is a perspective front view of the camera and frame, showing the manner of attaching the remaining tripod-legs when arranging the camera in a vertical position.

Similar letters refer to similar parts in all the figures.

The main camera frame or box A has its back and front drops or covers B and B' hinged thereto at one of their shorter sides, so as to provide guides $b$ and $b'$ of greater length than can be secured in a camera in which the guides, focusing-scale, &c., are carried on a drop-cover hinged on one of its longer sides. The bellows, shutter-frame, and swinging back or plate-holder frame are so attached to the box A that the focusing may be accomplished by sliding the shutter and lens frame forward upon the guides $b'$ for ordinary view-work or by sliding the plate-holder frame backward upon the more widely separated guides $b$ for photographing objects natural size, thus leaving the guides $b'$ free for the attachment of the ground-glass background and supporting-frame D, upon which the specimen O to be photographed may be laid when the camera is in the vertical position, as shown in Fig. 1. The slides $d\ d$ for supporting the background-frame D move readily upon the undercut guides $b'\ b'$ (see Fig. 1) and may be adjusted thereon for focusing by a rack and pinion operated by knob $b''$, and when focused may be secured to the guides by any desired form of clamping-screw. (Not shown.) The frame D may in turn be detachably secured to the slides $d\ d$ by a suitable clamping-screw, as at $e$, or may be hinged thereto by a shouldered hinge, as at $e'$, so as to fold down upon the inner side of the drop B' when the camera is closed for transportation, it being of course understood that whichever form of attachment is preferred will be used upon both the slides $d$.

Figure 3:
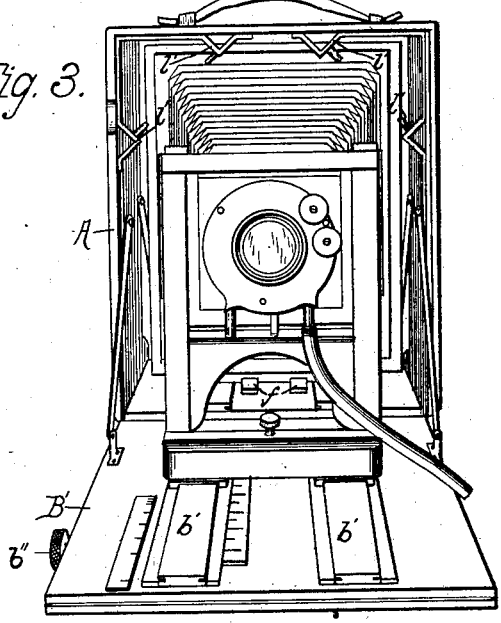

It is desirable that the focal length of the lens and the length of the guides $b\ b$ be so proportioned that when the shutter-frame is secured in contact with the stops $f\ f$, Fig. 3, and the plate-holding frame is moved backward to or slightly beyond the edge of the back drop B, as shown in Fig. 1, the image on the sensitive plate of an object situated a like distance in front of the lens will be full-sized. This will ordinarily be the case when the distance between the optical center of the lens and the sensitive plate is twice the focal length of the lens. Having once determined the relative positions of lens and plate-holder by trial or otherwise it is then only necessary to mark two coinciding points upon guides $b$ and plate-holder frame, at which point they may thereafter be secured, and when the object is then brought into focus by adjusting object-support D the image will be full size.

To afford a firm support for the camera in its vertical position, four brackets or lugs $l'$ are secured near the inside upper corners of the box A, as shown in Fig. 3, to which the upper ends of two of the tripod-legs, previously detached from lugs $l$ of the tripod-head, Fig. 2, are secured. The camera may then be tilted to the position shown in Fig. 1, the support D attached to the guides $b'$, and the camera focused for full-sized photographing or copying.

It is sometimes difficult in laboratories and elsewhere where this form of camera finds frequent use to secure even and adequate lighting for the object to be photographed. To obviate this difficulty, I secure to the camera-frame at suitable points rings or other means of attachment $r$, to which may be secured supporting cords or wires $r'$. These rings are preferably three in number and attached as shown in Fig. 1, though I do not wish to limit myself to any specified number or location for such suspension devices. Suspension cords or wires, as $r'$, being secured to the rings $r$, the tripod-legs may be removed and the upper ends of $r'$ secured to a single point of support, leaving the entire camera, with its self-contained object-support, free to oscillate or rotate about a vertical axis without disturbing the relative positions of the object and the lens. The camera may then be given a half-turn on its suspension-cords, the shutter opened, and after about one-half of the normal exposure has been given the camera-frame may be allowed to rotate back to its first position for the remainder of the exposure, thus sufficiently lighting all sides of the object without the use of reflecting-screens or other devices.

The operation of my improved camera is clearly described in the foregoing, but briefly restated it is as follows: For ordinary view photography the camera-box is attached to the top of the tripod in the ordinary manner with the lens-axis horizontal, the object-support D and its slides $d\ d$ removed from the guides $b'\ b'$, and the camera then differs from ordinary view-cameras only in having the longer dimension of the plate-holder normally vertical; but even this may be obviated by the use of any of the well-known forms of rotating camera-backs.

To arrange the camera for photographing objects in full size, two of the tripod-legs are detached from the head, attached to the inner lugs $l'$, the camera tipped to a vertical position, the support D attached by means of the long slides $d\ d$, and the camera then focused by locking the shutter-frame and plate-holder frame in the positions above mentioned and moving the object-support upon the guides $b'$ till the desired focus is obtained. For uniform lighting the tripod is dispensed with entirely and the suspension devices $r\ r\ r'\ r'$ substituted to allow the camera to rotate as a whole, as above described.

What I claim as my invention, and desire to secure by letters Patent, is—

1. In a portable view-camera, an object-support attached to a hinged drop of the camera-frame.

2. In a portable view-camera, a folding object-support attached to a hinged side of the camera-box.

3. In a portable view-camera, a folding and focusing object-support attached to a hinged side of the camera-box.

4. In a photographic camera, in combination with the main frame, directly-secured lugs for the attachment of tripod-legs, said lugs being so positioned as to direct the lens-axis vertically.

5. A photographic camera having tripod-leg brackets interiorly secured directly to the main frame, whereto the tripod-legs may be attached to position the camera with its lens-axis vertical, substantially as described.

6. In a photographic camera, in combination, a main frame, a drop hinged thereto, guides on said drop, slides adjustably secured to said guides and an object-support secured to said slides, substantially as described.

7. In a photographic camera, in combination, a drop hinged to the main frame, guides secured to said drop, slides adjustably secured to said guides, and an object-support hinged to said slides, substantially as described.

8. In a photographic camera, in combination, a main frame, a drop hinged thereto along one of its shorter sides, guides extending throughout substantially the entire length of said drop, slides adjustably and removably secured to said guides and an object-support secured to said slides, substantially as described.

9. In a photographic camera, a main frame, a drop hinged to said frame, an object-support secured to said drop, and flexible suspension devices for rotatably supporting said camera-frame and object-support simultaneously, in substantially vertical alinement.

10. In a photographic camera, in combination, an object-support secured to said camera, supporting devices secured to the camera-frame, and flexible supports attached to said supporting devices, whereby the camera and object-support may be rotated about a vertical axis without disturbing their relative positions, substantially as described.

11. In a portable photographic camera, in combination, a plate-holder frame and a focusing object-support located substantially equidistant from the optical center of the lens.

12. In a portable photographic camera, in combination, a main body, a lens-frame supported thereon, front and rear drops each hinged to said main body along one of its shorter sides, guides on the rear drop for adjustably supporting the plate-holder frame, and guides on the front drop for adjustably supporting an object-support, substantially as described.

In testimony whereof I have signed my name to this specification in the presence of two subscribing witnesses.

GUY N. COLLINS.

Witnesses:
W. E. SAFFORD,
E. BROWN.